United States Patent [19]
Koyama

[11] Patent Number: 5,990,804
[45] Date of Patent: Nov. 23, 1999

[54] ANIMATE BODY DETECTOR

[75] Inventor: Takeshi Koyama, Tokyo, Japan

[73] Assignee: Sony Corporation, Tokyo, Japan

[21] Appl. No.: 08/989,584

[22] Filed: Dec. 12, 1997

[30] Foreign Application Priority Data

Dec. 16, 1996 [JP] Japan ..................................... 8-335895

[51] Int. Cl.[6] ................................................. G08B 23/00
[52] U.S. Cl. ................ 340/825.34; 340/539; 340/573.1; 382/115; 382/124; 382/127; 382/188; 345/168; 345/173; 345/174; 331/65
[58] Field of Search ............................. 340/825.34, 573, 340/539, 573.1; 382/115, 124, 127, 188; 345/168, 173, 174; 331/65

[56] References Cited

U.S. PATENT DOCUMENTS

| 4,771,268 | 9/1988 | Sone et al. .............................. 382/188 |
| 5,541,580 | 7/1996 | Gerston et al. .......................... 340/573 |
| 5,565,658 | 10/1996 | Gerpheide et al. ...................... 345/174 |

*Primary Examiner*—Brian Zimmerman
*Assistant Examiner*—Yves Dalencourt
*Attorney, Agent, or Firm*—Frommer Lawrence & Haug, LLP.; William S. Frommer

[57] ABSTRACT

The subject oscillation frequency generating section generates a subject oscillation frequency in response to the capacitance of subject when the subject contacts the measurement electrode. The subject recognition signal generating section generates a subject recognition signal corresponding to the subject oscillation frequency. The reference signal setting section previously sets a reference signal used to determine whether the subject is an animate body. The animate body detection control section compares the subject recognition signal and the reference signal to determine whether the subject is an animate body.

15 Claims, 15 Drawing Sheets

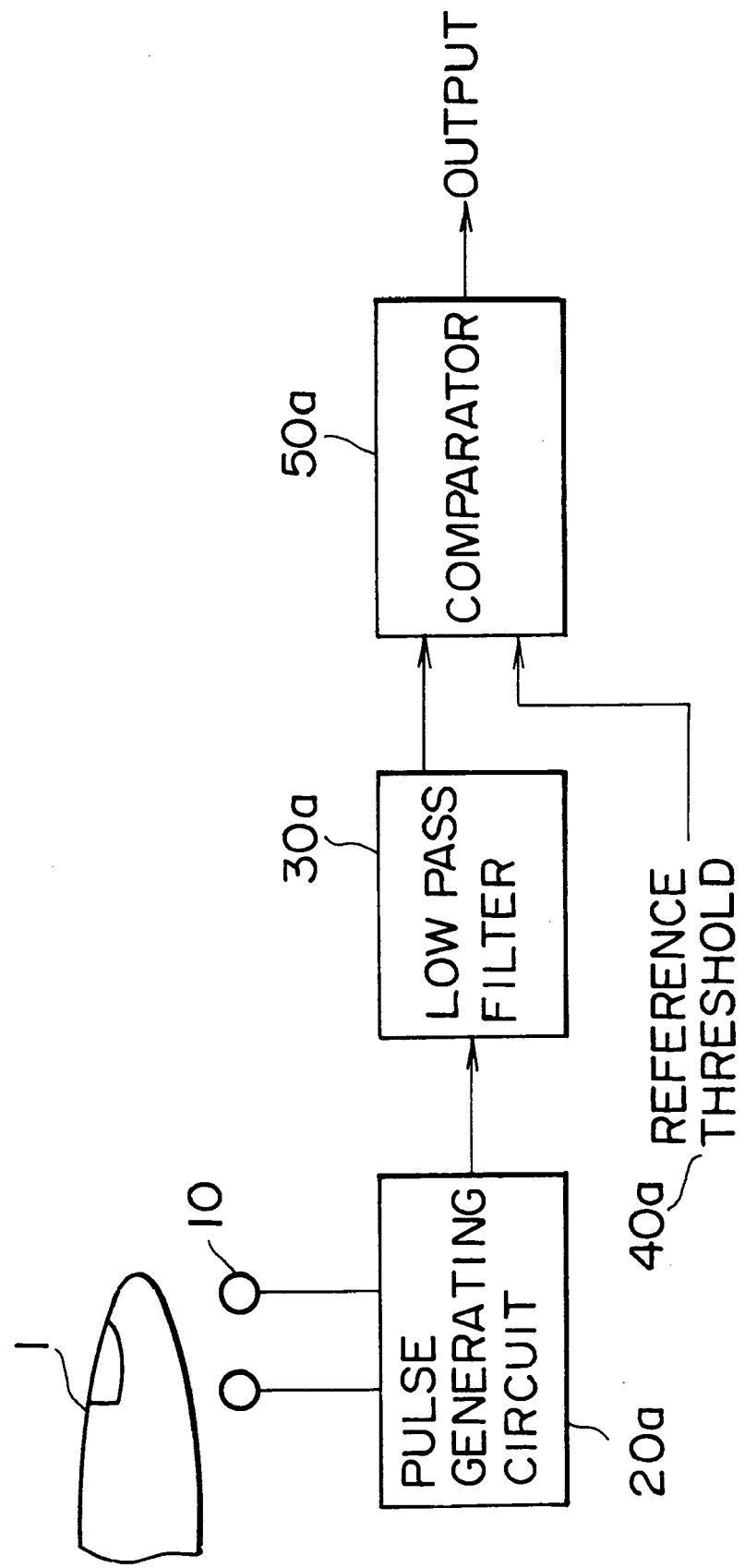

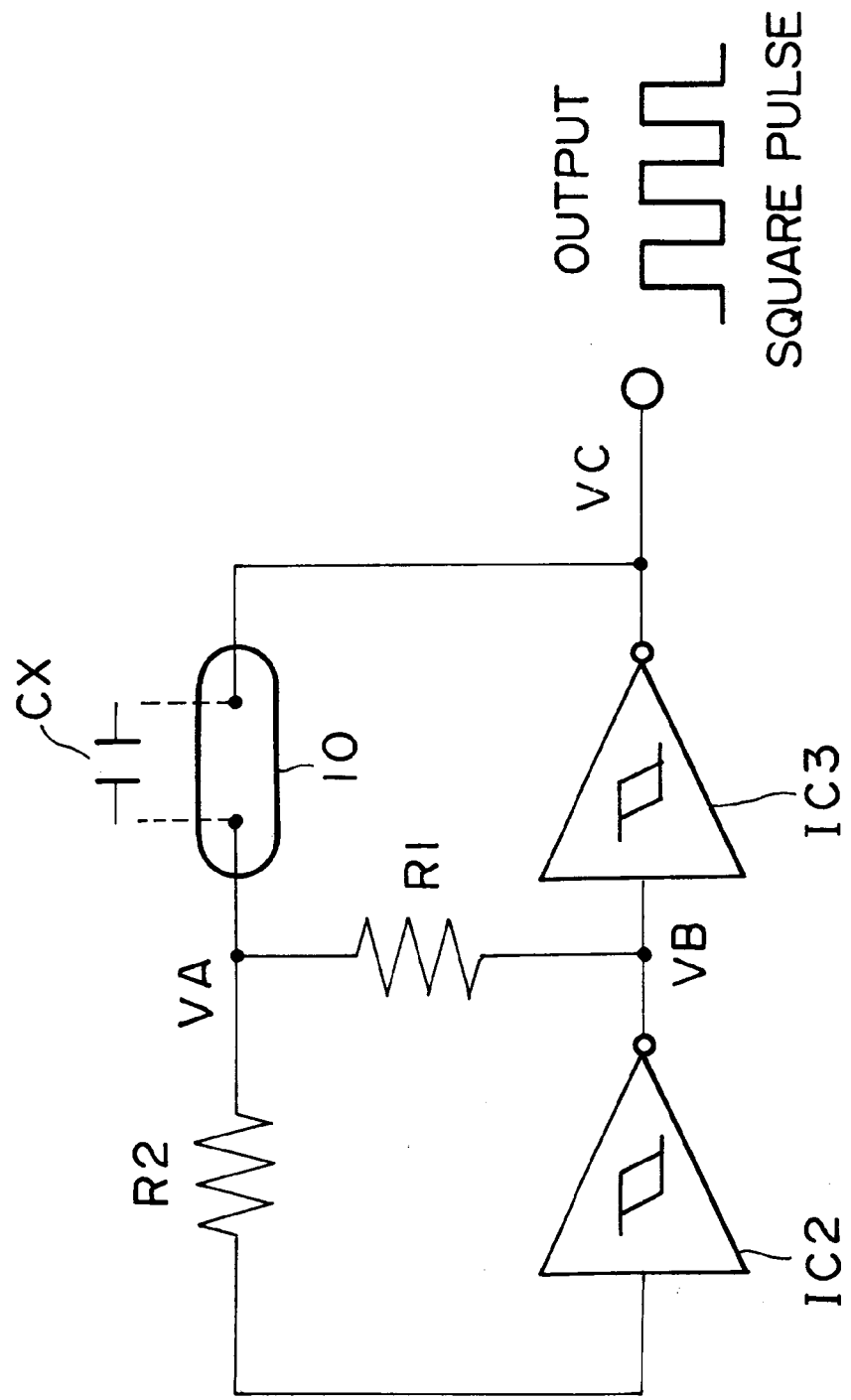

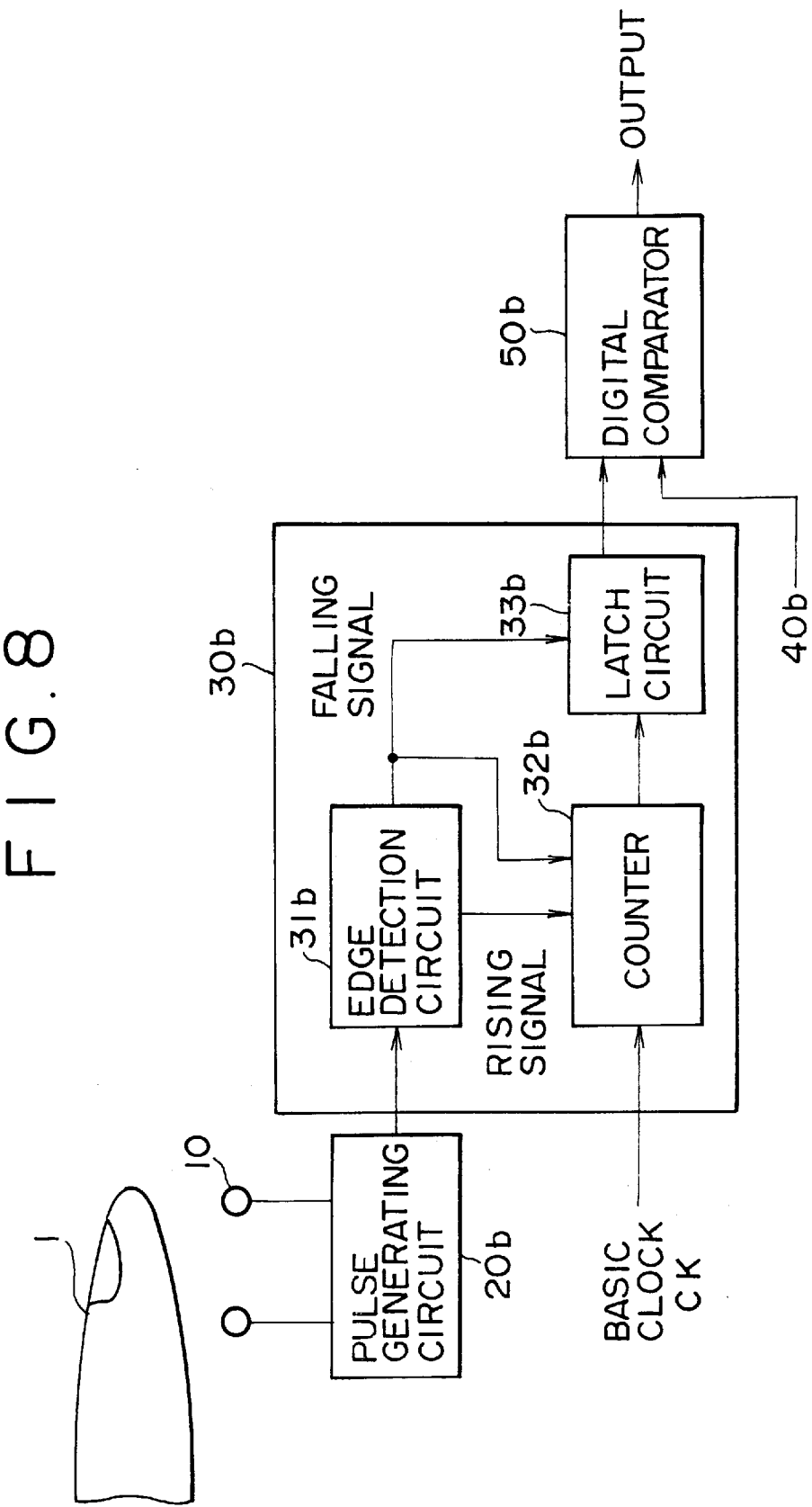

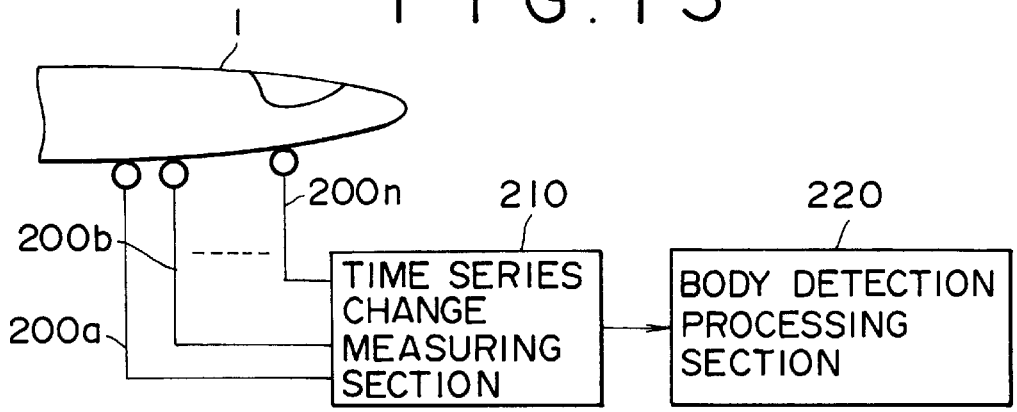
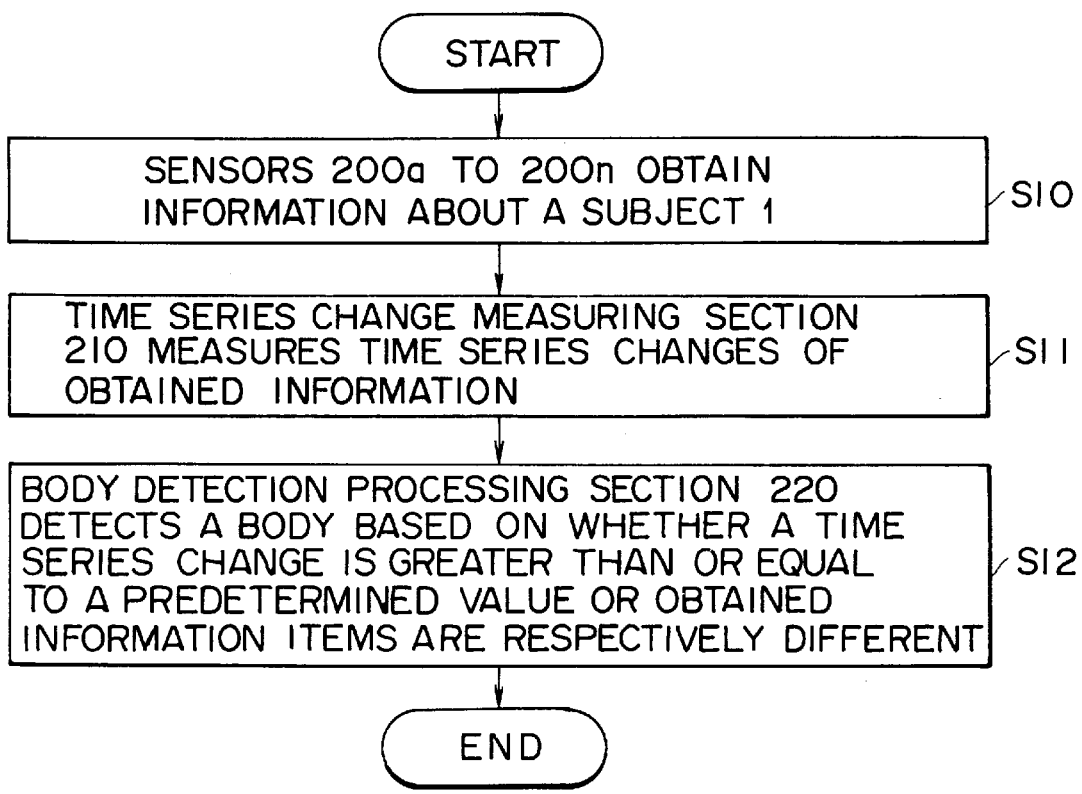

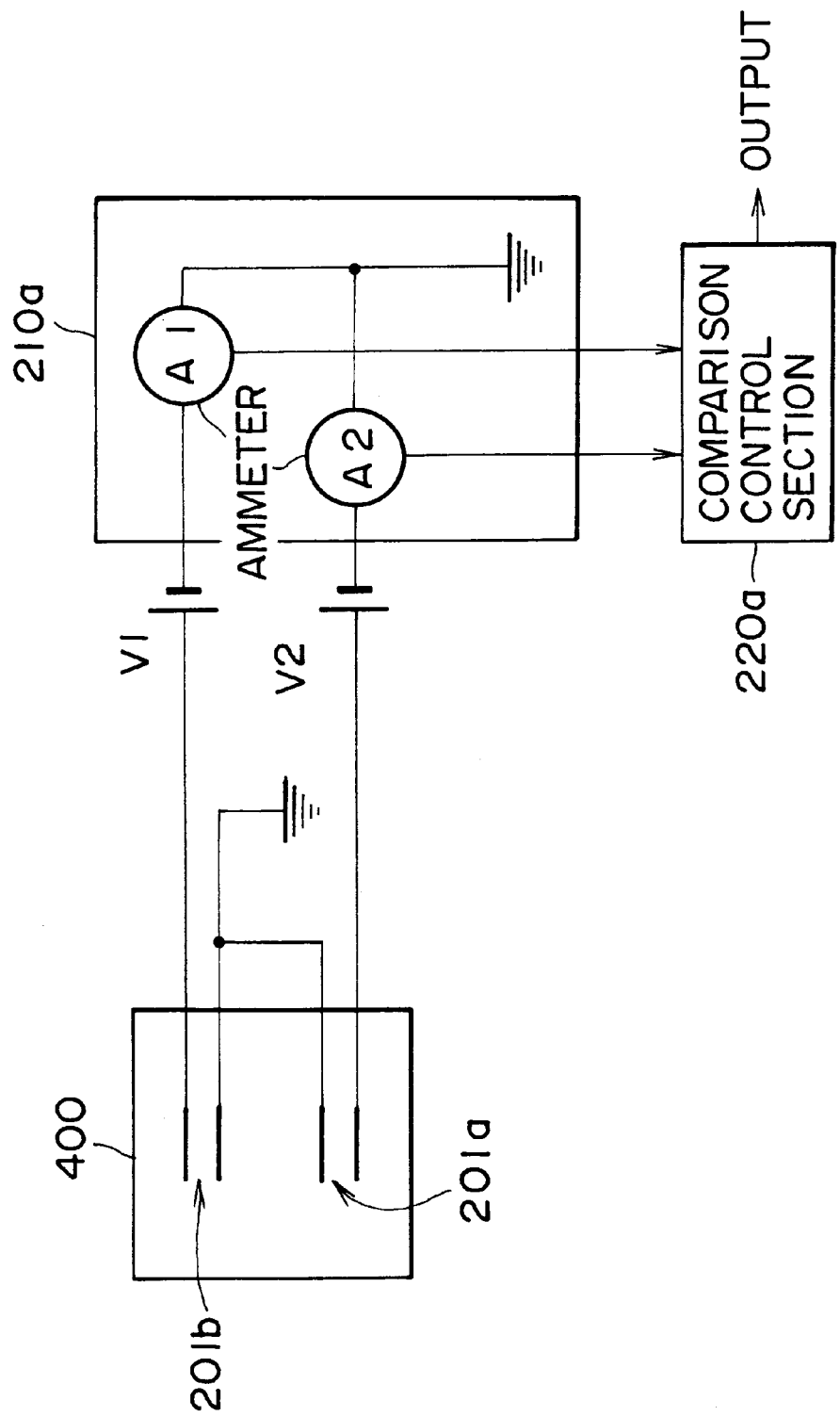

ANIMATE BODY DETECTOR

BACKGROUND OF THE INVENTION

1. Field of the Invention

The present invention relates to an animate body detector and, more specifically, to an animate body detector for determining whether a subject to be checked is an animate body.

2. Description of Related Art

Technologies on security of information processing systems are developing with the progression of computerization society. For example, it has been conventional to use ID cards to control entry to a computer room, but they tend to be lost or stolen. For this reason, ID cards are being replaced by an individual validation system which checks individuals to enter the room by consulting individuals' fingerprints or the like previously registered.

In such an individual validation system, a check is sometimes passed by creating a replica of a registered fingerprint. Accordingly, an individual validation system must determine whether subjects to be checked are animate bodies, besides making fingerprint comparisons.

The technique for determining whether subjects to be checked are animate bodies is disclosed in Japanese Patent Laid-Open No. Hei 3-38621 that detects animate bodies by animate body detection means exploiting skin pressure dependence.

General animate body detectors exploiting capacitance detect an animate body by using a sine wave voltage to measure the capacitance of a contacting subject to be checked.

However, the above-mentioned prior art has a problem that many parts including a light source are required and circuit configuration is complicated because an animate body is detected in a way that irradiates light to a subject to be checked and measures the reflection factor of its reflected light.

The prior art of using capacitance described later also has a problem that it is difficult to miniaturize an animate body detector because a sine wave voltage generator is required to measure capacitance.

SUMMARY OF THE INVENTION

With such circumstances in view, this invention has been made and its object is to provide a compact animate body detector having simple circuit configuration.

According to this invention to solve the above-mentioned problems there is provided an animate body detector for determining whether a subject to be checked is an animate body, comprising: a measurement electrode contacting said subject; a subject oscillation frequency generating section for generating a subject oscillation frequency in response to the capacitance of said subject when said subject contacts the measurement electrode; a subject recognition signal generating section for generating a subject recognition signal in response to said subject oscillation frequency; a reference signal setting section for previously setting a reference signal used to determine whether said subject is said animate body; and an animate body detection control section for comparing said subject recognition signal and said reference signal to determine whether said subject is said animate body.

Here, the subject oscillation frequency generating section generates a subject oscillation frequency in response to the capacitance of a subject when the subject contacts the measurement electrode. The subject recognition signal generating section generates a subject recognition signal in response to the subject oscillation frequency. The reference signal setting section previously sets a reference signal used to determine whether the subject is an animate body. The animate body detection control section compares the subject recognition signal and the reference signal to determine whether the subject is an animate body.

There is also provided an animate body detector for determining whether a subject to be checked is an animate body, comprising: a plurality of sensors contacting said subject; a time series change measuring section for measuring time series changes of information obtained from individual said sensors; and an animate body detection processing section for detecting that said subject is said animate body when said time series changes have a predetermined value or greater and information items obtained from individual sensors are respectively different.

Here, the time series change measuring section measures time series changes of information obtained from individual sensors. The animate body detection processing section detects that the subject is an animate body when the time series changes have a predetermined value or greater and information items obtained from individual sensors are respectively different.

Moreover, there is provided an animate body detector for determining whether a subject to be checked is an animate body, comprising: a detection electrode close to said subject; a subject recognition change rate generating section for generating a subject recognition change rate in response to capacitance change when said subject comes close to said detection electrode; and an animate body detecting section for determining whether said subject is said animate body, from said subject recognition change rate.

Here, the subject recognition change rate generating section generates a subject recognition change rate in response to capacitance change when the subject comes close to the detection electrode. The animate body detecting section determines whether the subject is an animate body, from the subject recognition change rate.

BRIEF DESCRIPTION OF THE DRAWINGS

FIG. 5 shows an analog processing circuit of a first concrete example of the first embodiment.

FIG. 6 shows the internal configuration of a pulse generating circuit.

FIG. 8 shows digital processing circuits of a second concrete example of the first embodiment.

FIG. 13 is a principle block diagram of a second embodiment of the animate body detector.

FIG. 14 is a flow chart for explaining the operation procedure of the second embodiment.

FIG. 15 shows the configuration of a first concrete example of the second embodiment.

DESCRIPTION OF THE PREFERRED EMBODIMENTS

Figure 1:
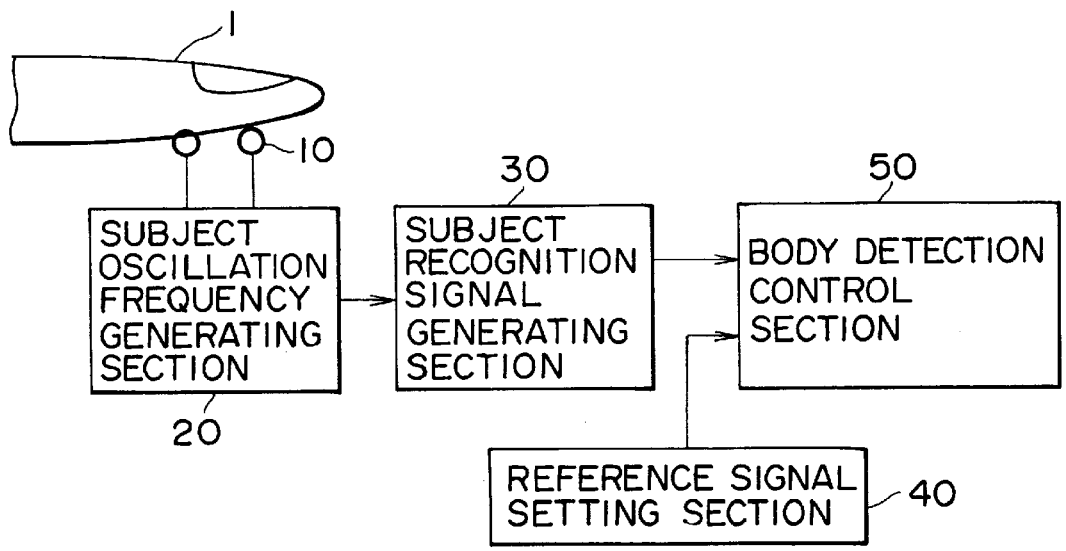
FIG. 1 is a principle block diagram of a first embodiment of an animate body detector.

Hereafter, embodiments of the present invention will be explained referring to the appended drawings. FIG. 1 is a principle block diagram of a first embodiment of an animate body detector. A subject oscillation frequency generating section 20 generates a subject oscillation frequency in response to the capacitance of a subject 1 when the subject 1 contacts a measurement electrode 10. A subject recognition signal generating section 30 generates a subject recognition signal in response to the subject oscillation frequency. A reference signal setting section 40 previously sets a reference signal used to determine whether the subject 1 is an animate body. An animate body detection control section 50 compares the subject recognition signal and the reference signal and determines whether the subject 1 is an animate body.

Figure 2:
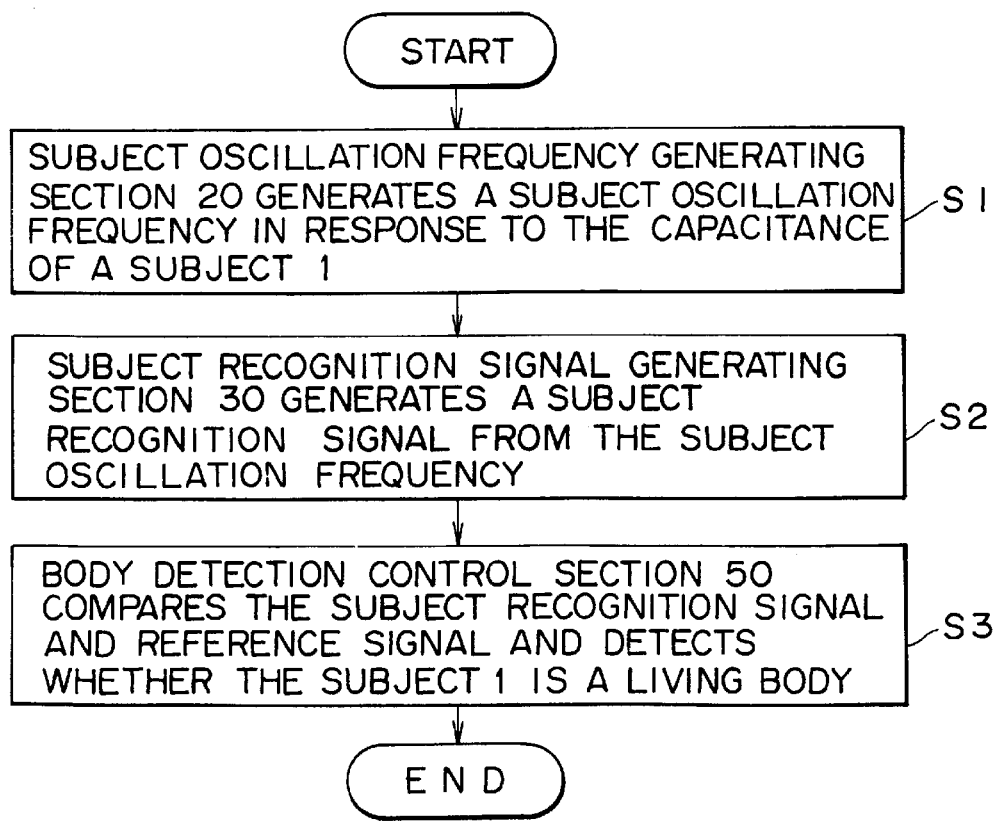
FIG. 2 is a flow chart for explaining the operation procedure of the first embodiment.

Next, the operation of the animate body detector will be explained. FIG. 2 is a flow chart for explaining the operation procedure of the first embodiment.

[S1] A subject oscillation frequency generating section 20 generates a subject oscillation frequency in response to the capacitance of the subject 1 when the subject 1 contacts the measurement electrode 10.

[S2] A subject recognition signal generating section 30 generates a subject recognition signal corresponding to the subject oscillation frequency.

[S3] An animate body detection control section 50 compares the subject recognition signal and a reference signal previously set in a reference signal setting section 40 and determines whether the subject 1 is an animate body.

Figure 3:
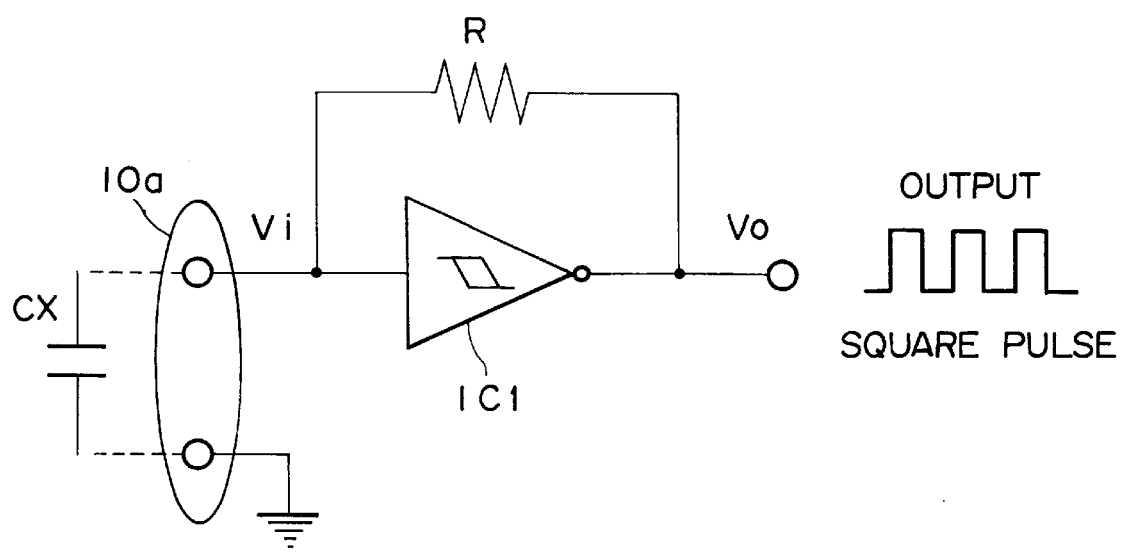
FIG. 3 shows a measuring circuit for measuring capacitance.

Next, the principle of an animate body detector exploiting capacitance will be explained. FIG. 3 shows a measuring circuit for measuring capacitance. The measuring circuit, a CR oscillator using a Schmidt inverter, comprises external measurement terminals 10a, a resistor R, and a Schmidt inverter IC1. One of the external measurement terminals 10a is grounded and the other is connected to the input terminal of Schmidt inverter IC1. Moreover, the output of Schmidt inverter IC1 is fed back to the input terminal through the resistor R. Connecting a capacitor Cx between the external measurement terminals 10a causes oscillation and produces square pulses.

Figure 4A:
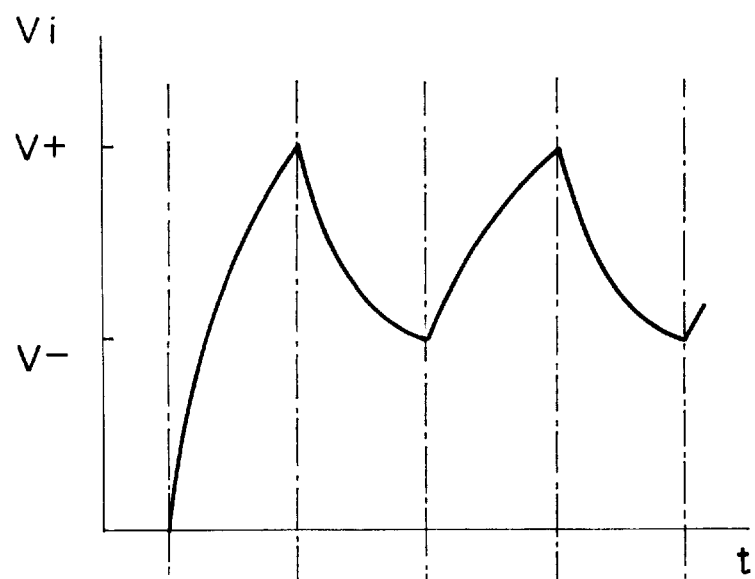
FIGS. 4A and 4B show timing charts for the input voltages and output voltages of the measuring circuit. A timing chart (FIG. 4A) takes input voltages of a Schmidt inverter along the vertical axis and time along the horizontal axis. A timing chart (FIG. 4B) takes output voltages of a Schmidt inverter along the vertical axis and time along the horizontal axis.
Figure 4B:
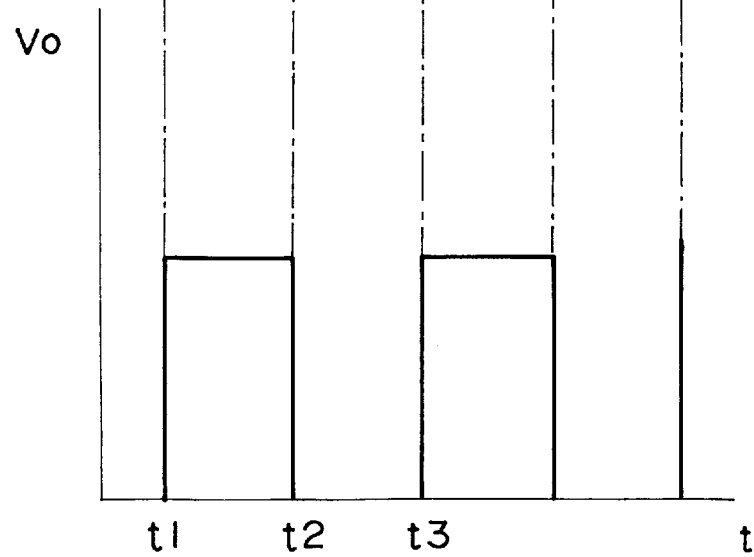

Next, the operation of the animate body detector will be explained. FIGS. 4A and 4B show timing charts for the input voltages Vi and output voltages Vo of the measuring circuit. A timing chart (FIG. 4A) takes input voltages Vi of the Schmidt inverter IC1 along the vertical axis and time along the horizontal axis. A timing chart (FIG. 4B) takes output voltages of the Schmidt inverter IC1 along the vertical axis and time along the horizontal axis.

At time t1 directly after power on, since the voltage of capacitor Cx does not change immediately, Vi is Low, and so Vo is High. Since Vo is High, Cx starts to be charged through the resistor R. Vi rises gradually and reaches a threshold voltage V− at time t2, at which time the output of the Schmidt inverter IC1 goes Low inversely.

The capacitor Cx starts to be discharged at this point, a current flows through the resistor R, and input voltage Vi drops gradually. The input voltage Vi drops and reaches a threshold voltage V− at time t3, at which time the output voltage Vo goes High inversely and rises again. Thereafter, this operation is repeated and the oscillation voltage of square wave develops at the output.

As explained above, connecting the capacitor Cx between the external measurement terminals 10a causes oscillation and outputs an oscillation frequency at the output terminal of the Schmidt inverter IC1. Accordingly, if the subject 1 contacting the external measurement terminals 10a has capacitance, an oscillation frequency corresponding to the capacitance will be obtained. The difference of the oscillation frequency between animate bodies and objects other than animate bodies makes it possible to determine whether a subject to be checked is an animate body.

Next, a first concrete example of a first embodiment will be explained. FIG. 5 shows an analog processing circuit of a first concrete example of the first embodiment. A pulse generating circuit 20a generates a subject oscillation frequency in response to the capacitance of subject 1 when the subject 1 contacts the measurement electrode 10. A low pass filter 30a removes the radio-frequency components of the oscillation frequency. A comparator 50a compares the oscillation frequency from which the radio-frequency components have been removed, and a reference threshold value 40a, and determines whether the subject 1 is an animate body.

Here, an oscillation frequency corresponding to the capacitance of an insulation is set as a reference threshold value 40a. If the oscillation frequency output from the low pass filter 30a is lower than the reference threshold value 40a, the animate body detector determines that the subject 1 is an animate body.

This is because when the subject 1 is an insulation, the capacitance between the measurement electrodes 10a is very small. To the contrary, human skins exhibit capacitance tens to thousands times that of insulations. Accordingly, since oscillation frequencies are in inverse proportion to capacitance, it follows that oscillation frequencies lower than the oscillation frequencies of insulations imply an animate body.

Next, the internal configuration of the pulse generating circuit 20a will be explained. FIG. 6 shows the internal configuration of a pulse generating circuit 20a. The pulse generating circuit 20a has two Schmidt inverters IC2 and IC3 connected in series. The output of the Schmidt inverter IC3 is connected to one terminal of the measurement electrode 10 and another terminal of the measurement electrode 10 is connected to resistors R1 and R2. Moreover, the resistor R2 is connected to the input terminal of the Schmidt inverter IC2 and the resistor R1 is connected to the output terminal of the Schmidt inverter IC2 and the input terminal of the Schmidt inverter IC3.

Figure 7A:
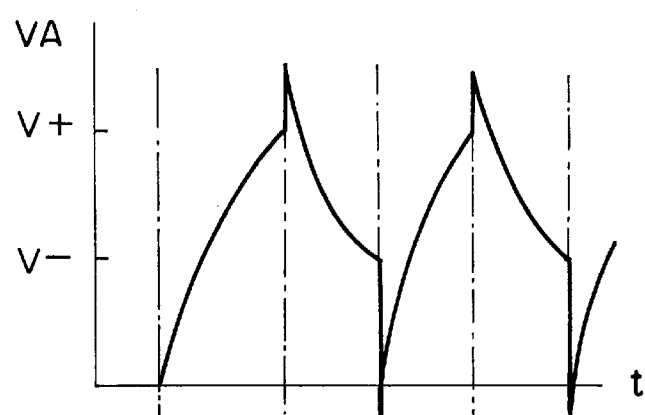
FIGS. 7A to 7C show the respective timing charts for the voltages VA, VB, and VC of the pulse generating circuit. A timing chart (FIG. 7A) takes voltage VA along the vertical axis and time along the horizontal axis. A timing chart (FIG. 7B) takes voltage VB along the vertical axis and time along the horizontal axis. A timing chart (FIG. 7C) takes voltage VC along the vertical axis and time along the horizontal axis.
Figure 7B:
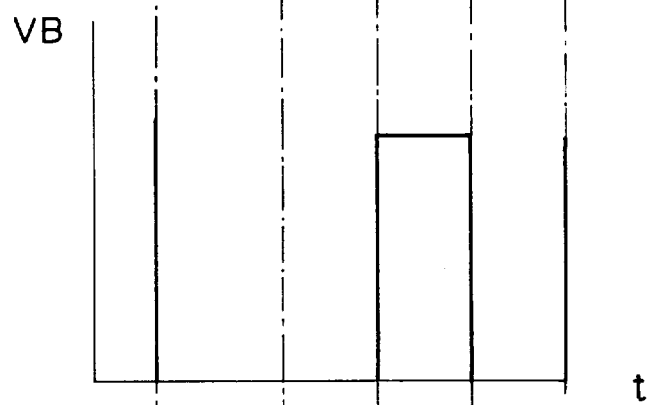
Figure 7C:
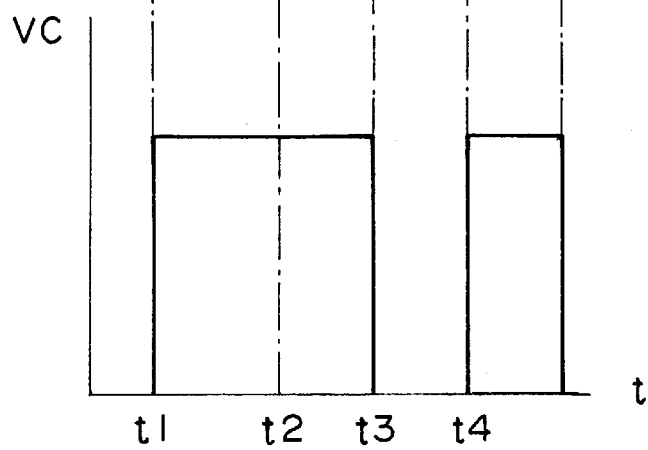

Next, the operation of the pulse generating circuit will be explained. FIGS. 7A to 7C show the respective timing charts for the voltages VA, VB, and VC of the pulse generating circuit 20a. The timing chart (FIG. 7A) takes the input voltage VA of Schmidt inverter IC2 along the vertical axis and time along the horizontal axis. The timing chart (FIG. 7B) takes the output voltage VB of Schmidt inverter IC2 along the vertical axis and time along the horizontal axis. The timing chart (FIG. 7C) takes the output voltage VC of Schmidt inverter IC3 along the vertical axis and time along the horizontal axis.

The moment the voltage VB goes from High to Low at time t1, the voltage VC is inverted from Low to High. The moment the voltage VC goes High, a charge current flows suddenly through the capacitor CX and charges are stocked therein.

The voltage VA starts to rise at time t1 and reaches a threshold voltage V+ at time t2. The voltage VB is unchanged and is Low, and the voltage VC also remains High. The capacitor Cx starts to be discharged at time t2, a current flows through the resistor R1, and the voltage VA drops gradually.

When the voltage VA drops to a threshold voltage V− at time t3, since the voltage VB goes inversely High, the voltage VC goes Low.

Thereafter, since the capacitor CX is charged again through the resistor R1, the voltage VA rises gradually and reaches the threshold voltage V+ at time t4. The voltage VB goes from High to Low and the voltage VC goes from Low to High. Thereafter, this operation is repeated and the oscillation voltage of square wave develops at the output of voltage VC.

As explained above, the first concrete example of the first embodiment constructionally detects an animate body by measuring the capacitance of the subject 1 by the CR oscillator. This will help simplify circuit configuration and make the equipment compact.

Next, a second concrete example of the first embodiment will be explained. In the second example, an animate body is detected by deducing that the High or Low duration of a square pulse is long, from the fact that if the subject 1 is an animate body. an oscillation frequency thereof is small.

FIG. 8 shows digital processing circuits of the second concrete example of the first embodiment. A pulse oscillation circuit 20b generates a subject oscillation frequency in response to the capacitance of the subject 1 when the subject 1 contacts the measurement electrode 10. An edge detection circuit 31b carries out edge detection when the output pulse of the subject oscillation frequency goes from Low to High. A rising detection signal at this time is transmitted as a count start signal of a counter 32b. The counter 32b receives the rising detection signal and starts to count by basic clock CK.

Thereafter, the edge detection circuit 31b carries out edge detection when the output pulse of the subject oscillation frequency goes from High to Low. A falling detection signal at this time is transmitted as a count stop signal of the counter 32b. Moreover, the falling detection signal is used as a latch enable signal for a latch circuit 33b for latching the output of the counter 32b. A digital comparator 50b compares a count value output from the latch circuit 33b and a reference threshold value 40b, and determines whether the subject 1 is an animate body.

As explained above, according to the second concrete example of the first embodiment, the animate body detector is constructed so that the High or Low duration of output pulses of the subject 1 is counted by the basic clock CK and the count value is compared with the reference threshold value 40b recognized as an animate body to determine whether the subject 1 is an animate body. This will help simplify circuit configuration and make the equipment compact.

Next, the principle of detecting an animate body by measuring the change rate of capacitance will be explained. As an alternative to the method of animate body detection based on a momentary capacitance value according to the above-mentioned first and second examples, an animate body can also be detected by measuring the change rate of capacitance for a predetermined period of time.

Figure 9:
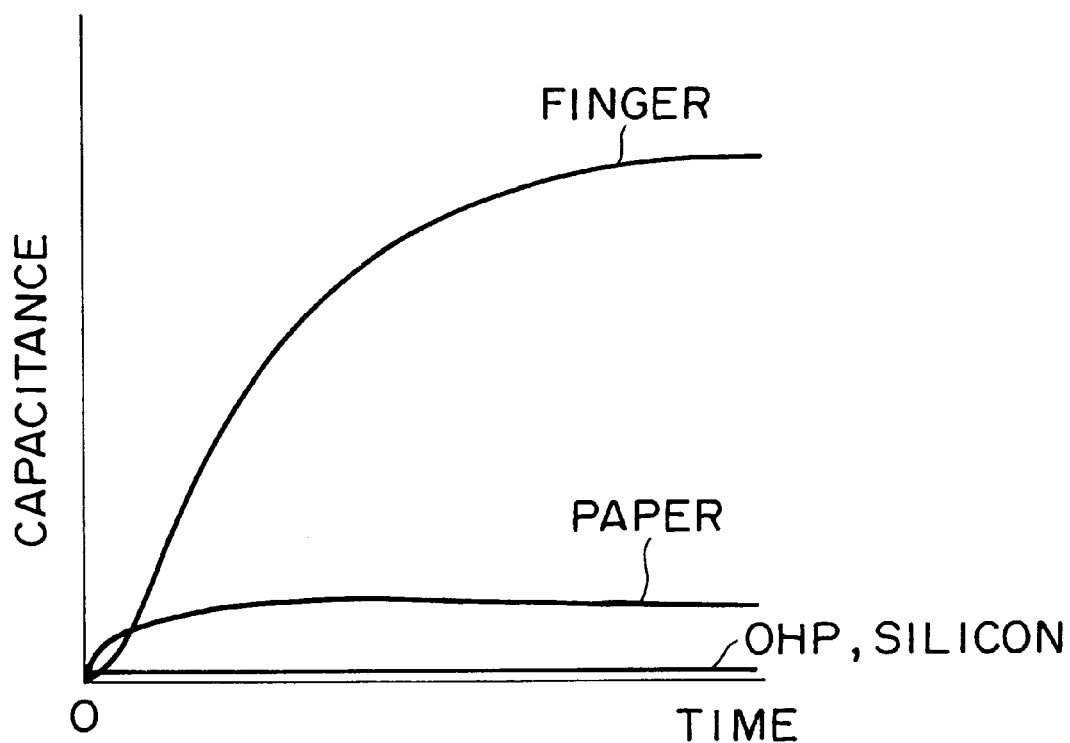
FIG. 9 shows how capacitance changes over time.

FIG. 9 shows how capacitance changes over time. The chart takes capacitance along the vertical axis and time along the horizontal axis. The capacitance of human fingers, which depends upon individuals and ambient environment, reaches saturation as shown in the chart after a certain time has elapsed.

The capacitance of paper is very small, about a tenth to a thousandth times that of human fingers. The capacitance of OHP and silicon rubber is almost 0.

As described above, the capacitance of animate human fingers characteristically rises up to a certain time, then reaches saturation. The capacitance of objects other than animate bodies is constant regardless of time. Therefore, the distinction between animate bodies and objects can be made by measuring the change rate of capacitance for a predetermined period of time.

Figure 10:
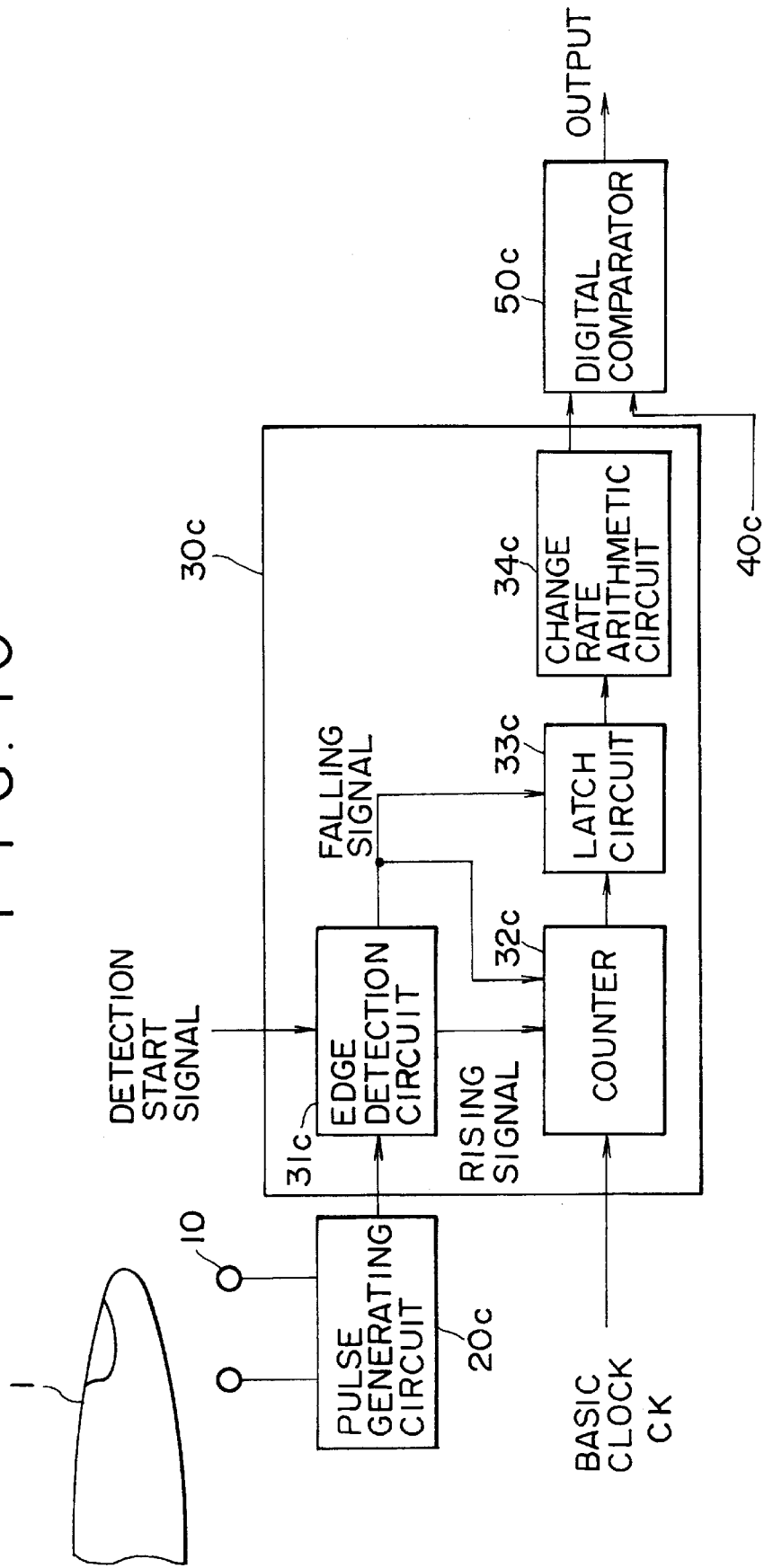
FIG. 10 shows a circuit exploiting the change rate of capacitance, as a third concrete example of the first embodiment.

Next, a third concrete example of the first embodiment will be explained. According to the third concrete example, an animate body is detected by measuring the above-mentioned change rate of capacitance. FIG. 10 shows a circuit exploiting the change rate of capacitance, as a third concrete example of the first embodiment. A pulse oscillation circuit 20c generates a subject oscillation frequency in response to the capacitance of the subject 1 when the subject 1 contacts the measurement electrode 10. An edge detection circuit 31c carries out edge detection continuously or intermittently under control of an edge detection start signal. It carries out edge detection when the output pulse of the subject oscillation frequency goes from Low to High. A rising detection signal at this time is transmitted as a count start signal of a counter 32c. The counter 32c receives the rising detection signal and starts to count by basic clock CK.

Thereafter, the edge detection circuit 31c carries out edge detection when the output pulse of the subject oscillation frequency goes from High to Low. A falling detection signal at this time is transmitted as a count stop signal of the counter 32c. Moreover, the falling detection signal is used as a latch enable signal for a latch circuit 33c for latching the output of the counter 32c.

Under control of the edge detection start signal, edge detection is carried out continuously or intermittently, and a plurality of durations of output pulses of the subject oscillation frequency are detected. Using these count values, a change rate arithmetic circuit 34c calculates a time-based change rate of the count values. A digital comparator 50c compares the change rate and a reference threshold value 40c recognized as an animate body to determine whether the subject 1 is an animate body.

Since capacitance thus changes in response to changes in oscillation frequencies, it follows that the count value of High or Low duration of output pulses changes. Therefore, by measuring the time series changes of the count value of High or Low duration, the distinction between animate bodies and other objects can be made from the fact that the former causes major changes and the latter exhibits no change (only minor changes are observed).

As explained above, the third concrete example of the first embodiment constructionally determines whether the subject 1 is an animate body, from time series changes of capacitance. This will help simplify circuit configuration and make the equipment compact.

Figure 11:
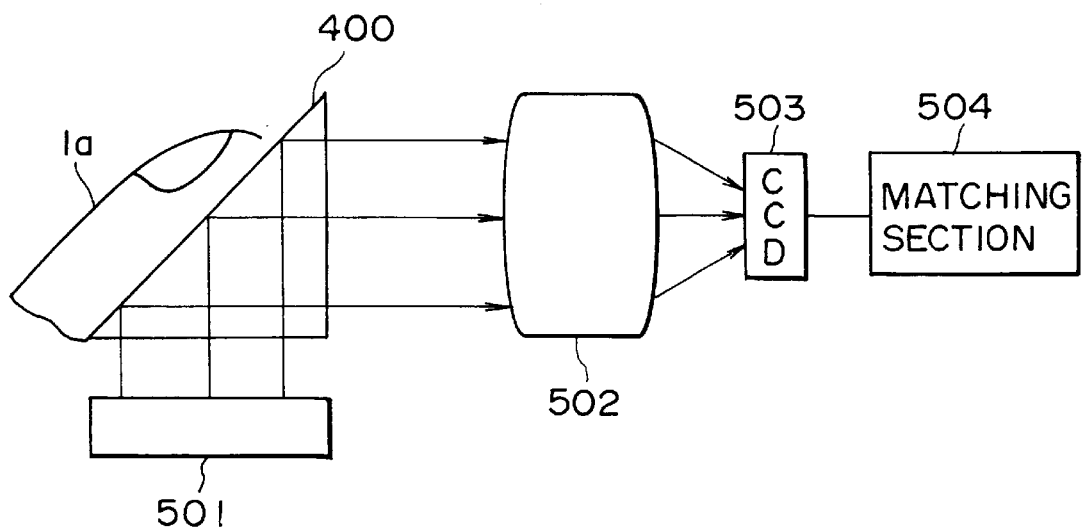
FIG. 11 shows the configuration of fingerprint matching equipment.

Next, general fingerprint matching equipment will be explained. FIG. 11 shows the configuration of fingerprint matching equipment. A LED 501 emits light to a prism 400 contacting a finger 1a. A lens 502 gathers light signals representing the asperity information of the fingerprint of the finger 1a. A CCD (Charge Coupled Device) 503 transforms the gathered light signals into electrical signals. A matching section 504 compares asperity information previously registered with the asperity information of the finger 1a to determine whether a match is found.

Figure 12:
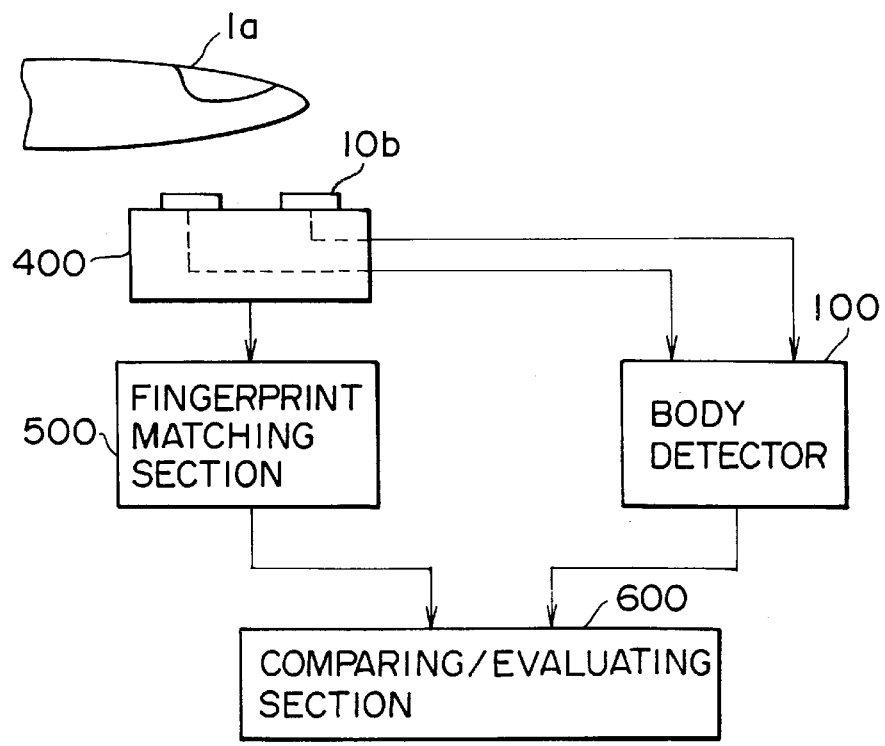
FIG. 12 shows the configuration of an individual validation system in which the animate body detector is applied to fingerprint matching equipment.

Next, an embodiment in which the animate body detector of the first embodiment is applied to the fingerprint matching equipment described above will be explained. FIG. 12 shows the configuration of an individual validation system in which the animate body detector is applied to fingerprint matching equipment. Measurement electrodes 10b are installed on a fingerprint read section 400. Since the fingerprint read section 400 is a transparent body such as a prism, transparent conductive films or the like are used for the measurement electrodes 10b. When a finger 1a contacts the measurement electrodes 10b, the fingerprint read section 400 gets asperity information thereof and a fingerprint matching section 500 compares it with registered asperity information to determine whether a match is found.

An animate body detector 100 determines whether the finger 1a is an animate body, from a momentary value or change rate of the capacitance of figure 1a obtained through the measurement electrodes 10b.

Thereafter, a comparing/evaluating section 600 compares the result of the fingerprint matching section 500 and the result of the animate body detector 100. As a result, if the fingerprint matches the registered asperity information and the finger is determined to be an animate body, the fingerprint is determined to pertain to said individual.

As explained above, this embodiment is constructed so that when asperity information of a fingerprint is input, animate body detection processing is performed along with fingerprint matching. This never fails to eject inputted forged fingerprints because even if they pass in the matching processing, they are ejected in the animate body detection processing.

Next, a second embodiment of an animate body detector according to this invention will be explained. The second embodiment exploits the characteristic that a variety of information items possessed by an animate body change in time series. FIG. 13 is a principle block diagram of the second embodiment of the animate body detector. The second embodiment has a plurality of sensors 200a, and 200b to 200n contacting the subject 1. A time series measuring section 210 measures the time series changes of information obtained from these individual sensors 200a to 200n. An animate body detection processing section 220 determines that the subject 1 is an animate body if the time series changes are greater than or equal to a predetermined value and information items obtained from the individual sensors 200a to 200n are respectively different.

Next, the operation of the animate body detector will be explained. FIG. 14 is a flow chart for explaining the operation procedure of the second embodiment.

[S10] Sensors 200a to 200n obtain information about the subject 1.

[S11] A time series measuring section 210 measures the time series changes of information obtained from the individual sensors 200a to 200n.

[S12] An animate body detection processing section 220 determines that the subject 1 is an animate body if the time series changes are greater than or equal to a predetermined value and information items obtained from the individual sensors 200a to 200n are respectively different.

As explained above, the second embodiment of this invention constructionally exploits the characteristic that a variety of information items possessed by an animate body change in time series. This makes it possible to distinguish between animate bodies and objects because information obtained from forgeries will not change in time series. Moreover, more precise distinction is made possible by providing a plurality of points to obtain information from and comparing obtained information items.

Next, a first concrete example of the second embodiment will be explained. FIG. 15 shows the configuration of a first concrete example of the second embodiment. Two electrodes 201a and 201b corresponding to sensors are installed on a fingerprint acquisition surface such as prism 400. One of electrodes 201a and 201b is grounded and the other is connected to voltage sources V1 or V2. The voltage sources V1 and V2 are connected to ammeters A1 and A2, respectively. A comparison control section 220a checks whether current values obtained from the ammeters A1 and A2 exhibit predetermined time series changes and are respectively different. If the current values exhibit predetermined time series changes and are respectively different. The subject is determined to be an animate body.

As explained above, the concrete example of the second embodiment constructionally sees if current values of subject 1, used as information, change in time series. This makes it possible to distinguish between animate bodies and objects because information obtained from forgeries will not change in time series. Moreover, the simplified circuit configuration helps to make the equipment compact.

Although current values are used as information about subject 1, capacitance, moisture (sweat amount), and pressure can also be used to reject forgeries by providing respective appropriate sensors 200a to 200n and observing time series changes obtained from them.

Figure 16:
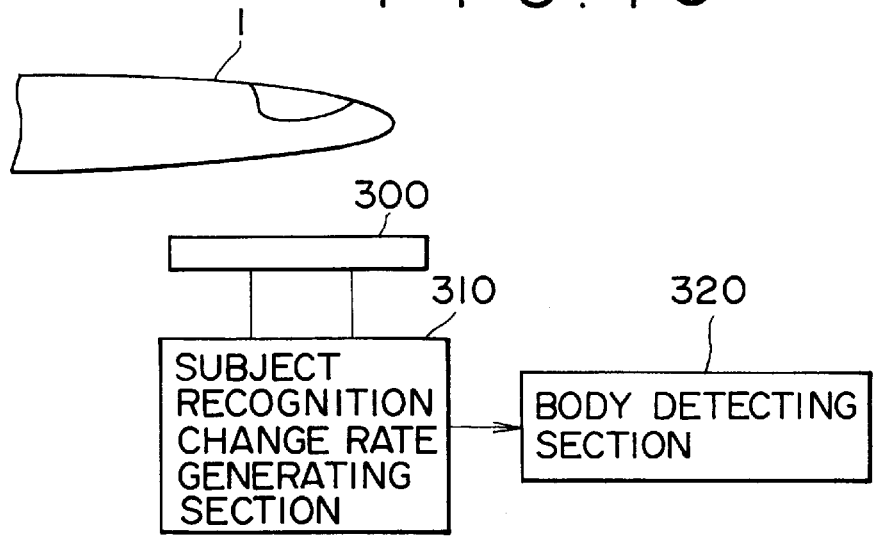
FIG. 16 is a principle block diagram of a third embodiment of the animate body detector.

Next, a third embodiment of an animate body detector of this invention will be explained. The third embodiment detects an animate body without allowing a detection electrode to contact a subject to be checked by using the capacitance change between the detection electrode and subject. FIG. 16 is a principle block diagram of the third embodiment of the animate body detector. The third embodiment has a detection electrode 300 close to the subject 1. A subject recognition change rate generating section 310 generates a subject recognition change rate in response to capacitance change when the subject 1 comes close to the detection electrode 300. An animate body detecting section 320 determines whether the subject 1 is an animate body, from the subject recognition change rate.

Figure 17:
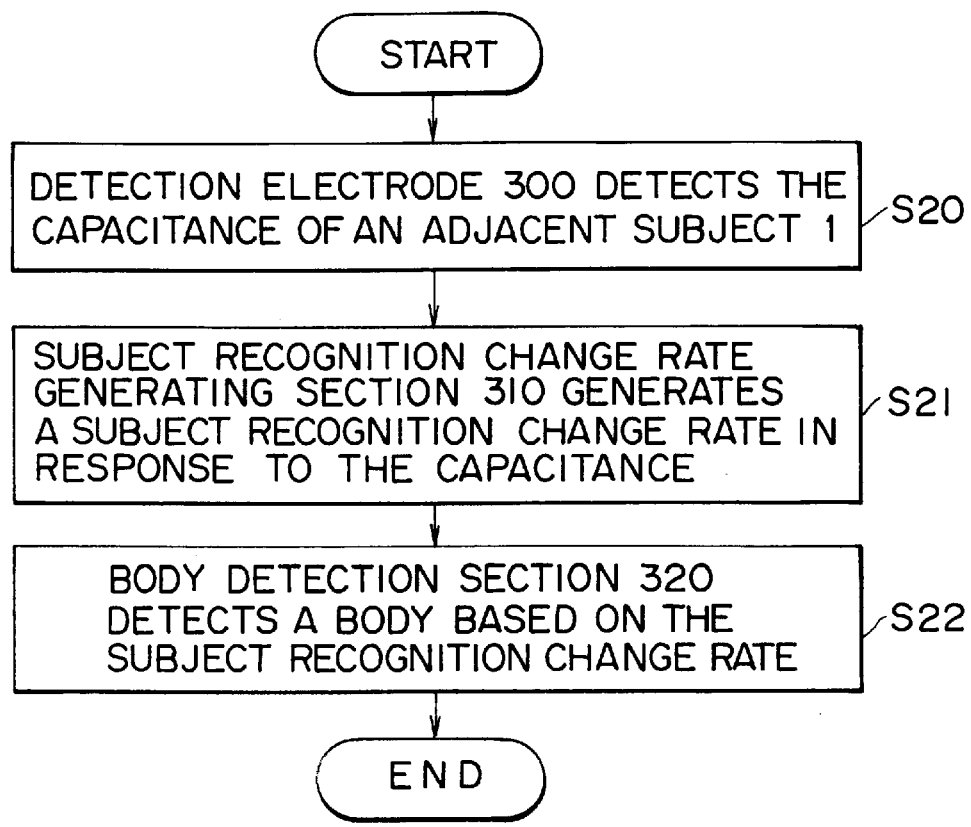
FIG. 17 is a flow chart for explaining the operation procedure of the third embodiment.

Next, the operation of the third embodiment will be explained. FIG. 17 is a flow chart for explaining the operation procedure of the third embodiment.

[S20] The detection electrode 300 detects the capacitance of subject 1 placed close.

[S21] The subject recognition change rate generating section 310 generates a subject recognition change rate in response to capacitance change when the subject 1 comes close to the detection electrode 300.

[S22] The animate body detecting section 320 determines whether the subject 1 is an animate body, from the subject recognition change rate.

As explained above, the third embodiment constructionally uses the capacitance change between the detection electrode 300 and subject 1 without allowing the detection electrode 300 to contact the subject 1. This provides improved reliability and durability of the detection electrode 300 because the detection electrode 300 can be coated with a protective film or an elastic film suitable to read fingerprints.

Figure 18:
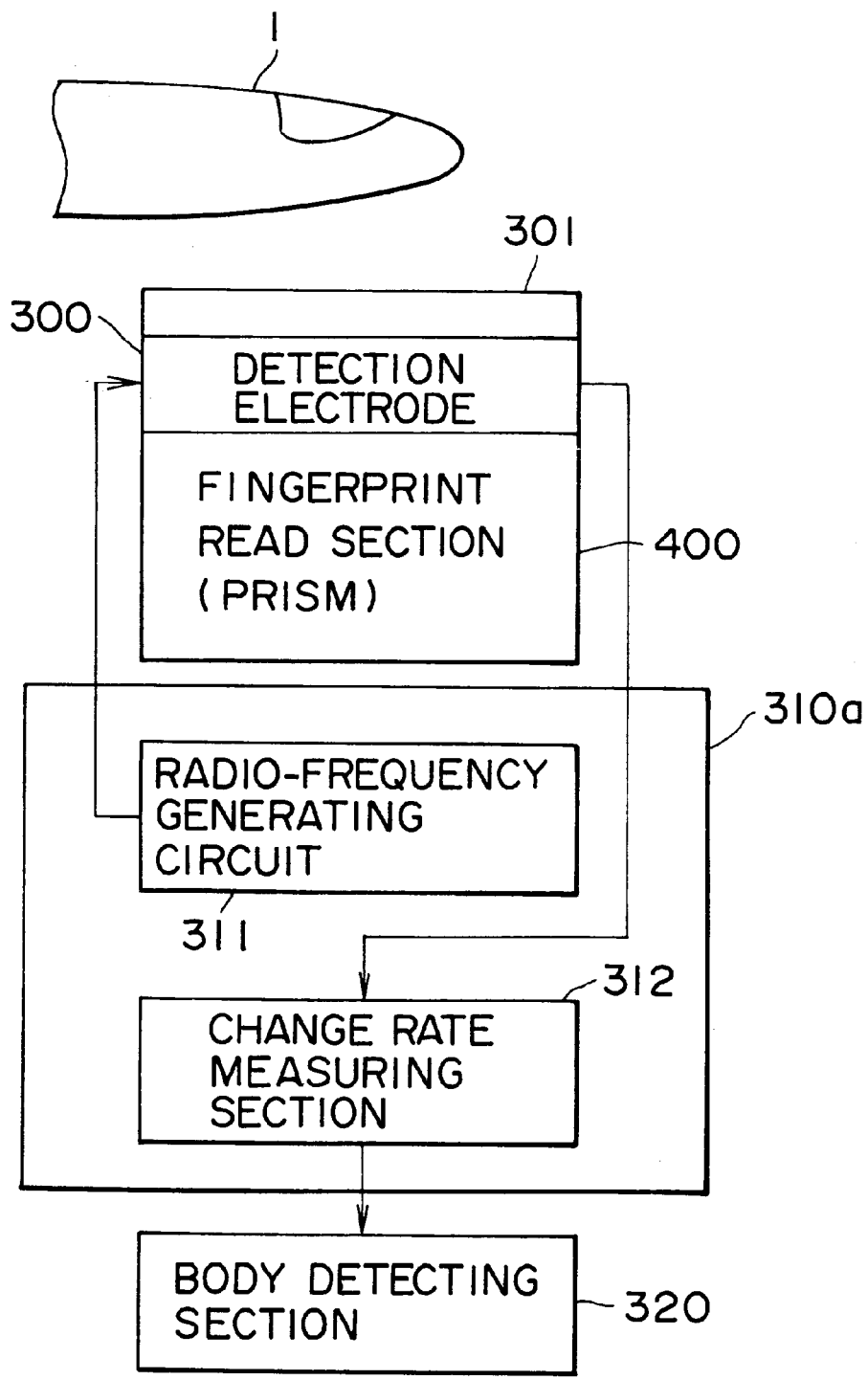
FIG. 18 shows the configuration of a first concrete example of the third embodiment.

Next, a concrete example of the third embodiment will be explained. FIG. 18 shows the configuration of a first concrete example of the third embodiment. A detection electrode 300 is placed on a fingerprint read section 400. Moreover, a coating film 301 is placed on the detection electrode 300. A radio-frequency generating circuit 311 applies a radio-frequency voltage to the detection electrode 300. A change rate measuring section 312 measures the oscillation amplitude change rate or frequency change rate of radio-frequency voltage when a finger 1*a* comes close to the detection electrode 300. An animate body detecting section 320 determines from the change rate whether the finger 1*a* is an animate body.

As explained above, the first concrete example of the third embodiment constructionally measures changes in capacitance by applying a radio-frequency voltage to the measurement electrode 300 and measuring the oscillation amplitude change rate or frequency change rate of the radio-frequency voltage. This will help simplify circuit configuration and make the equipment compact.

Figure 19:
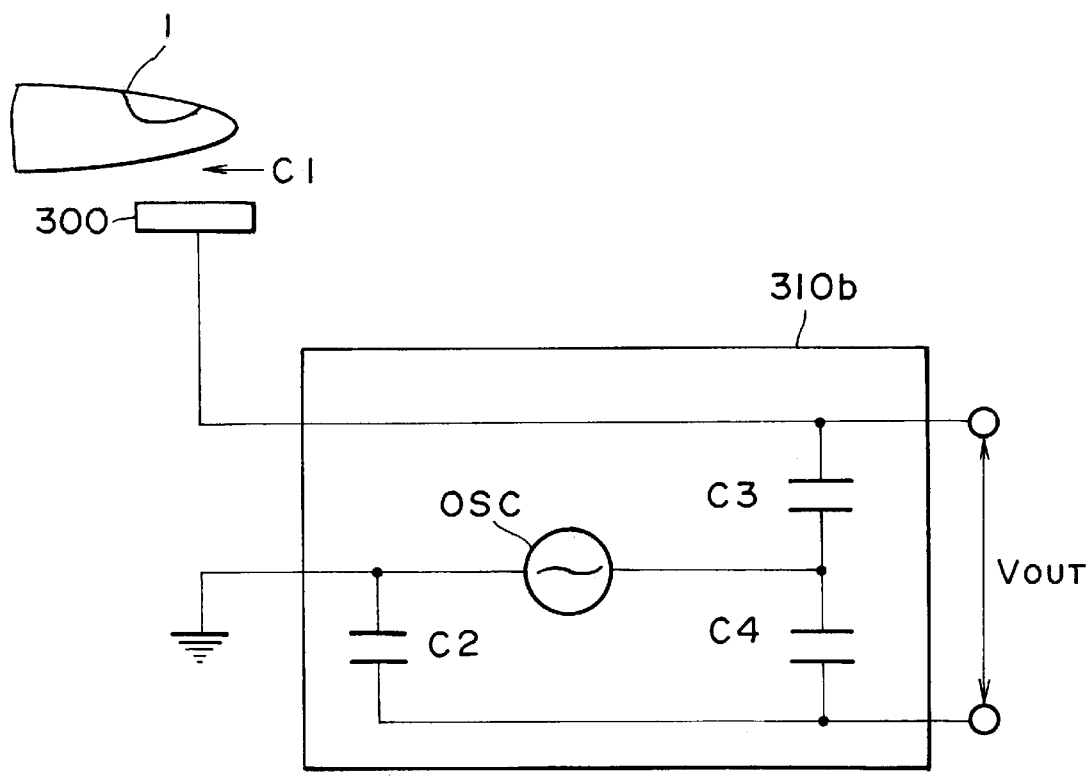
FIG. 19 shows the internal configuration of a subject recognition change rate generating section.

Next, a second concrete example of the third embodiment will be explained. FIG. 19 shows the configuration of the second concrete example of the third embodiment. According to the second concrete example, a subject recognition change rate generating section 310*b* comprises a bridge type capacitance detecting circuit. The bridge type capacitance detecting circuit has capacitors C1 to C4 placed in bridge form. The capacitor C1 has capacitance that develops between the subject 1 and the detection electrode 300. The bridge type capacitance detecting circuit outputs the capacitance change as an change in the voltage Vout based on an oscillation frequency of OSC.

As explained above, the concrete example of the third embodiment constructionally measures changes in capacitance using a bridge type capacitance detecting circuit. This will help simplify circuit configuration and make the equipment compact.

What is claimed is:

1. An animate body detector for determining whether a subject to be checked is an animate body, comprising:

a measurement electrode contacting said subject;

an oscillation frequency generating section for generating an oscillation frequency in response to the capacitance of said subject when said subject contacts the measurement electrodes;

said oscillation frequency generating section consisting of:

a first Schmidt inverter and a second Schmidt inverter connected in series, a first resistor connected between the input and the output of said second inverter through said electrodes, a second resistor connected between the input and output of said second inverter through said first resistor;

a subject recognition signal generating section for generating a subject recognition signal in response to said oscillation frequency;

a reference signal setting section for setting a reference signal; and an animate body detection control section for comparing said subject recognition signal and said reference signal to determine whether said subject is said animate body.

2. An animate body detector as claimed in claim 1, wherein said subject oscillation frequency generating section comprises a CR oscillator.

3. An animate body detector as claimed in claim 1, wherein said subject recognition signal generating section eliminates the radio-frequency components of said subject oscillation frequency to generate said subject recognition signal, and said reference signal setting section sets an oscillation frequency corresponding to the capacitance of an insulation as said reference signal.

4. An animate body detector as claimed in claim 3, wherein said animate body detection control section determines that said subject is said animate body when said subject recognition signal is lower in frequency than said reference signal.

5. An animate body detector as claimed in claim 1, wherein said subject recognition signal generating section, as said subject recognition signal, sets a count value resulting from counting the duration of output pulse of said subject oscillation frequency, while said reference signal setting section, as said reference signal, sets a lower-limit count value recognizable as a count value resulting from counting the duration of output pulse of an oscillation frequency corresponding to the capacitance of said animate body.

6. An animate body detector as claimed in claim 5, wherein said animate body detection control section determines that said subject is said animate body when said subject recognition signal has a larger count value than said reference signal.

7. An animate body detector as claimed in claim 1, wherein said subject recognition signal generating section, as said subject recognition signal, sets the change rate of a subject oscillation frequency corresponding to capacitance exhibited when said subject contacts said measurement electrode for a predetermined period of time, while said reference signal setting section, as said reference signal, sets a lower-limit change rate recognizable as the change rate of an oscillation frequency corresponding to capacitance exhibited when said animate body contacts said measurement electrode for a predetermined period of time.

8. An animate body detector as claimed in claim 7, wherein said animate body detection control section determines that said subject is said animate body when said subject recognition signal has a larger change rate than said reference signal.

9. An animate body detector for determining whether a subject to be checked is an animate body, comprising:

a plurality of sensors contacting said subject;

a time series change measuring section for measuring time series changes of information obtained from individual said sensors; and an animate body detection processing section for determining that said subject is said animate body when said time series changes have a predetermined value or greater and said information obtained from individual said sensors are respectively different.

10. An animate body detector as claimed in claim 9, wherein said sensors react to a state of said subject, said state being electrical resistance, capacitance, moisture, or pressure.

11. An animate body detector for determining whether a subject to be checked is an animate body, comprising:

a detection electrode contacting said subject;

a subject recognition change rate generating section for generating a subject recognition change rate in response to capacitance change when said subject comes close to said detection electrode; and an animate body detecting section for determining whether said subject is said animate body, based on said subject recognition change rate.

12. An animate body detector as claimed in claim 11, wherein said detection electrode is coated with a thin film.

13. An animate body detector as claimed in claim 11, wherein said subject recognition change rate generating section applies a radio-frequency voltage to said detection electrode and generates said subject recognition change rate as the oscillation amplitude change rate or frequency change rate of said radio-frequency voltage.

14. An animate body detector as claimed in claim 11, wherein said subject recognition change rate generating section comprises a bridge type capacitance detecting circuit and generates said subject recognition change rate as a voltage change rate.

15. An animate body detector for determining whether a subject which exhibits a capacitance is an animate body, comprising:

a plurality of measurement electrodes contacting said subject;

a basic clock;

a pulse oscillation circuit for generating a subject oscillation frequency in response to the capacitance of said subject when said subject contacts the measurement electrodes;

an edge detection circuit for carrying out edge detection of said oscillation frequency under control of an edge detection start signal;

a counter for counting a basic clock signal upon receiving a rising or falling detection signal from the edge detection circuit;

a change rate arithmetic circuit for receiving an input from said counter and calculating a time-based change rate of the input from the counter; and a comparator for comparing said time-based change rate to a reference threshold value recognized as an animate body to determine whether said subject is said animate body.

* * * * *